US008064479B2

(12) United States Patent
Assouline et al.

(10) Patent No.: US 8,064,479 B2
(45) Date of Patent: Nov. 22, 2011

(54) METHODS AND SYSTEM FOR EFFICIENT DATA TRANSFER OVER HYBRID FIBER COAX INFRASTRUCTURE

(75) Inventors: Lior Assouline, Rishon Lezion (IL); Amir Leventer, Kfar Saba (IL)

(73) Assignee: Harmonic, Inc., San Jose, CA (US)

( * ) Notice: Subject to any disclaimer, the term of this patent is extended or adjusted under 35 U.S.C. 154(b) by 385 days.

(21) Appl. No.: 12/341,785

(22) Filed: Dec. 22, 2008

(65) Prior Publication Data

US 2009/0168649 A1 Jul. 2, 2009

Related U.S. Application Data

(63) Continuation-in-part of application No. 12/341,513, filed on Dec. 22, 2008.

(60) Provisional application No. 61/018,602, filed on Jan. 2, 2008.

(51) Int. Cl.
*H04N 7/173* (2011.01)
(52) U.S. Cl. .......................................... 370/466; 725/86
(58) Field of Classification Search ................... 370/347, 370/509, 480, 392, 505, 466; 725/86, 25, 725/122, 100, 114, 110, 96; 707/10
See application file for complete search history.

(56) References Cited

U.S. PATENT DOCUMENTS

| | | | | |
|---|---|---|---|---|
| 6,693,878 B1 * | 2/2004 | Daruwalla et al. | ............ | 370/235 |
| 6,711,743 B1 * | 3/2004 | Hong et al. | ................... | 725/111 |
| 6,857,132 B1 * | 2/2005 | Rakib et al. | ................... | 725/114 |
| 7,039,048 B1 * | 5/2006 | Monta et al. | ................... | 370/389 |
| 7,423,982 B2 * | 9/2008 | Briggs et al. | ................... | 370/259 |
| 7,486,869 B2 * | 2/2009 | Alexander et al. | ............ | 386/200 |
| 7,532,712 B2 * | 5/2009 | Gonder et al. | .......... | 379/142.17 |
| 7,599,300 B2 * | 10/2009 | Berger et al. | ................. | 370/241 |
| 7,707,271 B2 * | 4/2010 | Rudkin et al. | ................ | 709/218 |
| 7,778,246 B2 * | 8/2010 | Choi et al. | ..................... | 370/389 |
| 7,864,686 B2 * | 1/2011 | Chapman et al. | ............. | 370/237 |
| 7,912,194 B2 * | 3/2011 | Gonder et al. | .......... | 379/142.17 |
| 7,916,755 B2 * | 3/2011 | Hasek et al. | ................... | 370/486 |
| 7,954,131 B2 * | 5/2011 | Cholas et al. | ................. | 725/112 |
| 2002/0154620 A1* | 10/2002 | Azenkot et al. | ............... | 370/347 |
| 2003/0093799 A1* | 5/2003 | Kauffman et al. | ............. | 725/86 |
| 2004/0181800 A1* | 9/2004 | Rakib et al. | ..................... | 725/25 |

(Continued)

OTHER PUBLICATIONS

Experimentally derived interactions between TCP traffic and service quality over DOCSIS cable links; This paper appears in: Global Telecommunications Conference, 2004. GLOBECOM '04. IEEE Issue Date: Nov. 29-Dec. 3, 2004.*

(Continued)

*Primary Examiner* — Salman Ahmed
(74) *Attorney, Agent, or Firm* — David R. Stevens; Stevens Law Group

(57) ABSTRACT

The invention is directed to a method for providing client-server data transfer over a Hybrid Fiber Coax network, comprising interfacing, at a client, a channel, wherein the channel is one of a video channel and a DOCSIS channel, intercepting a content request made from an end-user computing device, notifying a server of a relevant intercepted message via one of using an interactive channel and tagging the request, selecting content sent by the server over the channel, processing the content selected so as to return it to its IP traffic format, and forwarding the content in its IP traffic format to the end-user computing device.

49 Claims, 7 Drawing Sheets

U.S. PATENT DOCUMENTS

| | | | |
|---|---|---|---|
| 2004/0181811 A1* | 9/2004 | Rakib | 725/122 |
| 2005/0265394 A1* | 12/2005 | Chapman et al. | 370/480 |
| 2005/0265398 A1* | 12/2005 | Chapman et al. | 370/509 |
| 2007/0081537 A1* | 4/2007 | Wheelock | 370/392 |
| 2007/0121678 A1* | 5/2007 | Brooks et al. | 370/505 |
| 2007/0204314 A1* | 8/2007 | Hasek et al. | 725/100 |
| 2008/0098445 A1* | 4/2008 | Hildebrand et al. | 725/114 |
| 2008/0120667 A1* | 5/2008 | Zaltsman | 725/110 |
| 2009/0083279 A1* | 3/2009 | Hasek | 707/10 |
| 2009/0199250 A1* | 8/2009 | Assouline et al. | 725/96 |
| 2010/0077427 A1* | 3/2010 | Helms et al. | 725/32 |
| 2010/0306810 A1* | 12/2010 | Brooks et al. | 725/109 |

OTHER PUBLICATIONS

Resource planning and bandwidth allocation in hybrid fiber—coax residential networks; David Griffith, Kotikalapudi Sriram, Liliya Krivulina, Nada Golmie; Received Feb. 17, 2005; received in revised form May 31, 2005; accepted Jun. 6, 2005 Available online Aug. 11, 2005.*

Browse > Journals> Communications Magazine, IEEE . . . > vol. 46 Issue: 5; IPTV Systems, Standards and Architectures: Part II—IPTV Architectures for Cable Systems: An Evolutionary Approac; This paper appears in: Communications Magazine, IEEE Issue Date: May 2008 h.*

* cited by examiner

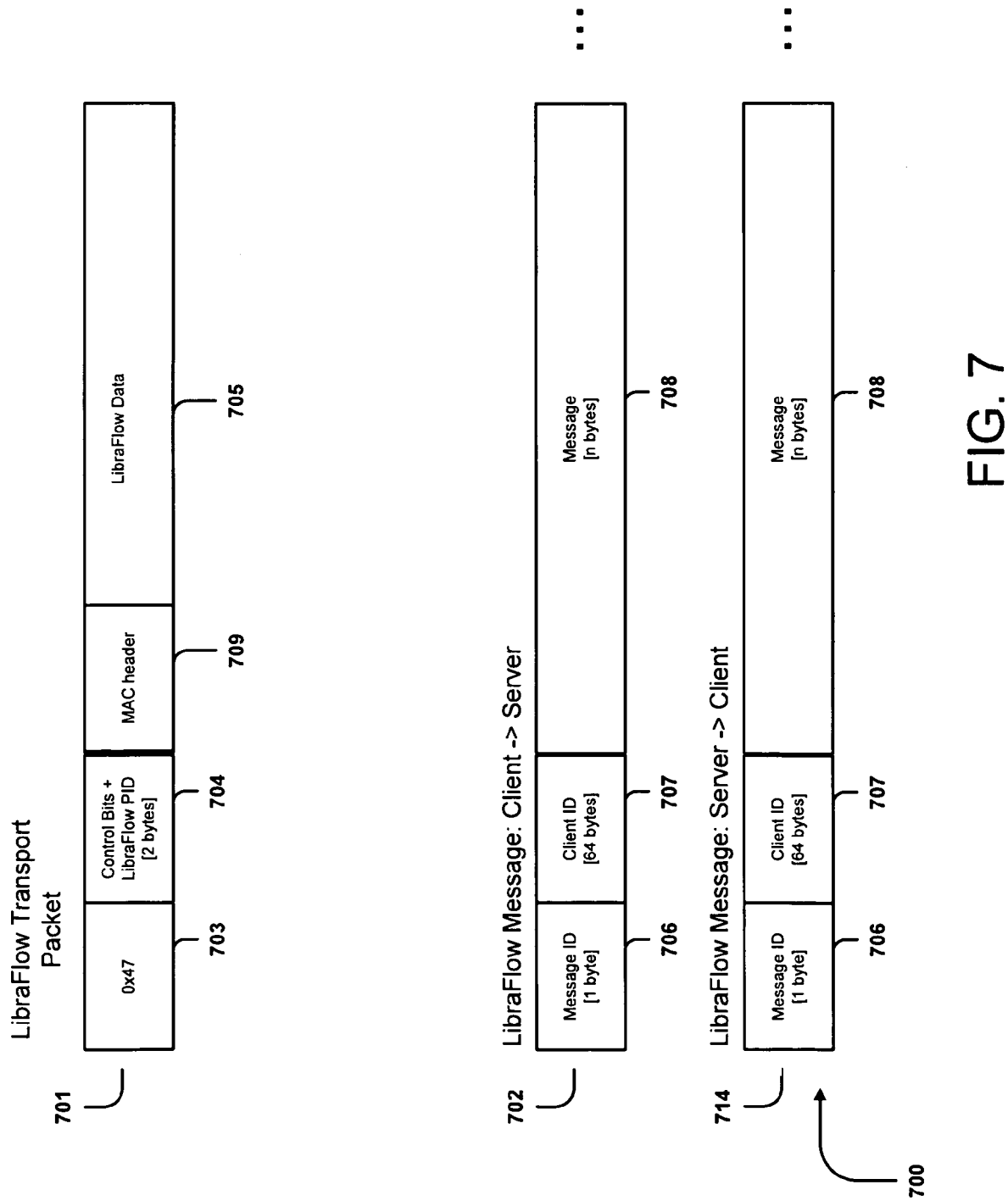

METHODS AND SYSTEM FOR EFFICIENT DATA TRANSFER OVER HYBRID FIBER COAX INFRASTRUCTURE

RELATED APPLICATIONS

This application claims priority based on U.S. Provisional Patent Application No. 61/018,602, filed on Jan. 2, 2008, entitled "Methods and System for Efficient Data Transfer Over Hybrid Fiber Cable Infrastructure." This application is also a continuation-in-part of U.S. Non-Provisional patent application Ser. No. 12/341,513, filed on Dec. 22, 2008, entitled "Methods and System for Efficient Data Transfer Over Hybrid Fiber Coax Infrastructure."

BACKGROUND

1. Technical Field

The invention is related to acceleration of internet protocol (IP) data content transfer and load balancing of IP content between Data Over Cable Service (DOCSIS) and MPEG2 Transport (TS) video channels over a Hybrid Fiber Coax (HFC) network and in particular to a system and methods to efficiently and transparently, monitor and process regular IP over DOCSIS and transfer relevant IP data (such as, but not limited to, Television Encoded Media Content, Television Encoded Media Streaming, Programs, Operating System Distribution Images etc . . . ) to end user computing devices (such as, but not limited to, Personal Computer (PC), Set Top Boxes (STB), Over the Top boxes (OTT) or Cable Modem (CM)), during periods where available bandwidth (BW) in the MPEG2 Transport video channels at the HFC infrastructure exists by rerouting & processing the relevant (mainly download) IP flow from the regular low latency and expensive DOCSIS channels direction into the high latency, much more reliable and relatively inexpensive video channels. This is done by encapsulating the content in a video-like transport packets, handle TCP inefficiencies (in case it is TCP—if it isn't then encapsulation is enough) related to high delay video channel by the use of performance enhancing proxy at the sub IP level, send it over video downlink only channels, extract and process the sent content from the video channels at the end user computing device either to be used immediately and taking care of TCP or any other transfer protocol emulation or by using storage if existing in order to cache the content for later demand by the computing device.

2. Related Art

In recent years the internet traffic size has grown exponentially. According to researchers, this growth is mainly attributed to video files either being sent over P2P networks, file downloads, or by direct streaming from Content delivery networks (CDN). It is further expected that the distribution of video content (in either delivery form) will further increase the internet traffic.

P2P traffic, for example, is an "all that you can get" traffic as opposed to bursts of data retrieval and mostly idles connection (http). This fact as well as native large size of video content puts a heavy load on the business model of any broadband operator (such as Cable operator). DOCSIS channels are designed for burst of traffic and not for a steady state traffic flow, as operators resell the same bandwidth to multiple users relying on statistical averaging to accommodate all users' BW requests in the BW limited provided channels. The exponential growth attributed to video traffic is forcing them to upgrade their cable plant with expensive solutions (node splitting, spectrum overlays, more DOCSIS QAM, to name few solutions, DSLAM upgrade, etc.)

Furthermore, in cables Hybrid Fiber Coax (HFC) plant, the network media (implemented as DOCSIS protocol) is shared amongst all users on a service group (SG). Therefore, a steady state, always on, "all that you can get" download service, ruins the statistical effect of uncorrelated networking requests and causes a very negative customer satisfaction especially in the "rush hours" of network capacity (typically at evenings). In addition, it is well known that P2P or other video content tends to be highly repetitive, i.e. several users are downloading the same content. While the media is shared amongst all users on a SG, the connection is individual, i.e. the same content is sent to multiple users on the SG and there is currently no solution for this inefficiency.

One solution for the DOCSIS channels overload is to use Deep Packet Inspection (DPI) in order to reduce the priority and Quality of Service (QoS) of the broadband application services (mainly targeted at P2P traffic). This has the effect of both decreasing the large pool of customer's running P2P application satisfaction on one hand and on the other, promotes ways to hide the P2P services such that DPI becomes irrelevant.

Another solution is to upgrade the cable plant capacity by Spectrum overlay, freeing analog channels, node splitting, etc. Since the video and other large file download applications are using "all you can get", this solution (although very expensive to implement) provides no real solution to the BW hungry traffic as it quickly fills up the newly available BW again.

While the DOCSIS channels are sharing their BW with all users on a SG, there are many video related services (such as Video on Demand (VOD)) for which channel BW is provisioned but is not used all the time. The BW allocated for those services is a function of the peak usage expected and is indeed used only at small portion of the day time.

Furthermore, a recent technological advance permits assigning channels to switched services (Switched Digital Video (SDV)) and therefore broadcasting and using their BW only when requested to do so by users tuning to these specific services. It is expected that more and more services will transition to switched technology since it offers an opportunity to use the statistics in order to free BW for services that are not required and provide a much greater service offering without actually increasing the HFC capacity. Again, the more switched services, the greater the amount of free BW available at certain hours of the day. In a typical current HFC installation, this amount of free BW sums up to approximately 10 times the amount of BW offered in DOCSIS channels. This factor is expected to grow as the transition to switched services increases. A problem with this available BW, however, is that it exists in video channels and there is currently no connection between DOCSIS channels and video channels.

Another recent technological advance is the use of Docsis Internet Protocol Television Bypass architecture which is using the video channels in order to stream to end-user devices an UDP/IP flow of video.

Another problem with video channel is that it uses a QAM with longer interleaver (in order to provide error free video transmission without retransmission as is implemented in the TCP/IP world). In addition, most common QAMs also use a dejittering and dedrifting buffers which add to the longer latency of the QAM. Typical video QAM latency is in the order of ~25 msec. Implementing the TCP protocol on these channels greatly reduces the maximal throughput since the server has to wait for a longer delay after transmitting the maximal TCP window in order to get an acknowledgment and continue with the next window of data.

Therefore, what is needed is a system and methods to use the available free BW in non DOCSIS channels (including, but not limited to, VOD channels, MPEG Transport (TS) channels, SDV channels) which are designed by worst case scenario, and use it to transparently redirect IP traffic on a best effort basis and bypassing the Cable Modem Termination System (CMTS). Such a system should require a low cost hardware (as bypassing the CMTS core and reuse of installed based equipment) or software addition to the user computing device in order to transparently catch the bypassed IP traffic and transfer the redirected IP content from the video channels into the computing device. It should also provide substantial increase in download speed for BW intensive content by incorporating an adapted performance enhancement proxy (PEP) while freeing the DOCSIS channel for interactive services such as http. The system should further utilize the fact that most of the content is repetitive, and thus send the content to multiple users and/or CPEs (customer-premises equipment) at once (Multicasting), and even push it to clients it expects will be requesting the content in the future. The system should further not involve a massive upgrade in the HFC plant, but rather an addition of a low cost redirecting server with an interface to the HFC resource managers and switching devices, and of software modifications to tuning devices at the users' premises in order to interface the video channels and capture the IP content sent and redirect it to the end-user computing device as if it came from the regular DOCSIS channels.

In order to solve many operational issues, the above solution should be performed on simple SW upgrade of current CPEs without any additional equipment or connectivity at the end-user premises.

SUMMARY

A "LibraFlow" system and methods as described herein provides a transparent IP traffic offloading from DOCSIS channels into non-DOCSIS channels, and IP traffic acceleration by using available free BW in non-DOCSIS channels, protocol enhancement proxies at both ends of the last mile link, and potentially local cache at the peer computing device. In addition, the content can be altered according to specific parameters of the downloading user.

The LibraFlow system is made of a LibraFlow Clients and Server. The LibraFlow Client consists of a driver operating in the user CM (or any other CPE) or even inside the computing device. The LibraFlow server consists of a computing device operating at the Cable premises typically at the Hub or Head-End.

The LibraFlow server is responsible for detecting LibraFlow relevant IP traffic (either by itself or by information sent from the CPE), prioritizing them, preprocessing them, building the transmission content, interfacing the resource management at the Cable plant in order to get the available free BW on non-DOCSIS channels, notifying the LibraFlow client of the transmission path chosen and finally transmitting the content in on the free BW available in non-DOCSIS channels. Moreover, LibraFlow server is responsible for any protocol conversions and/or manipulation in order to contend with the challenges of high latency and/or high BW in LibraFlow pipes.

The LibraFlow client (driver) is responsible for tuning on the specific transmission frequency as notified by the LibraFlow server, and extracting the LibraFlow-generated traffic out of the transport mux flowing there. The traffic is either sent to the user computing device or put on the local content cache for later potential access. The LibraFlow client can create either seamless or non-seamless added pipes to current regular broadband connections.

When the end user computing device, CM, or any device running the LibraFlow Client, is initialized, the LibraFlow driver registers with the LibraFlow server over the DOCSIS channel or any other bidirectional capable channel (such as, but not limited to, Out Of Band (OOB) channel in a STB environment) in a potentially secure connection (typically but not limited to secure socket layer—SSL). In this registration, the user computing device is assigned a LibraFlow Client ID and several Destination IDs. In addition, the end user computing device is assigned a certain number of keys to potentially be used in the decryption of the LibraFlow generated traffic). Then, the LibraFlow driver initializes the tuner device (which includes, but is not limited to, a Cable modem tuner, a DVB-C tuner card, a DVB-C tuner external device, a Set Top Box or Over the Top device connected to the local area network (LAN) running a client that receives LibraFlow generated traffic, or any other device that is able to tune to a certain QAM frequency and enables running a small client that will extract the LibraFlow generated traffic out of the received video transport traffic). In another embodiment of this invention, the end-user CPE is targeted using its MAC as a targeting address. In this case the CPE MAC has been communicated to the LibraFlow server in the registration process.

The LibraFlow client constantly listens for any transmission notification issued by the LibraFlow server. The transmission notification generally includes (but is not limited to) a QAM frequency and a LibraFlow destination ID. Whenever such notification is issued, the LibraFlow driver tunes the LibraFlow tuner device to the frequency as notified and extracts (out of the transport packets traffic) the LibraFlow generated traffic having the LibraFlow destination ID or the MAC layer that matches one of the destination IDs received in the registration stage. The traffic is then decrypted and potentially processed. One example of such processing is the insertion of targeted advertising in movies files or replacement of existing adverts by other adverts sent specifically to the user via another method, watermark insertion, encryption and decryption. The content is then either sent to the user computing device or indexed and placed in a local cache for later retrieval.

The LibraFlow server constantly listens for requests from end user computing devices made over DOCSIS channels (or in any other upstream connectivity). It also monitors the amount of free BW existing in the non DOCSIS QAMs and inserts the LibraFlow generated traffic by numerous methods such as but not limited to interfacing the resource manager of the cable plant and sending the traffic in the form of a new video session, receiving all traffic before it is being modulated (usually in internet protocol (IP) packets form) and replacing the available BW of certain types of packets (NULL TS packets, for example) with LibraFlow generated traffic and outputting it to the modulators.

The LibraFlow server prioritizes the servicing of the requests according to numerous criteria including, but not limited to, the nature of the underlying traffic (such as a greater priority for certain types of streaming traffic), various premium accounts, various cable operator statistics such as the available free BW, and various deals with content providers.

Before transmitting LibraFlow generated traffic to the LibraFlow tuner devices, the LibraFlow server notifies the LibraFlow drivers of the way the traffic should be extracted, which may include but is not limited to tuning frequency, service ID, and destination ID. This notification is sent through a channel such as but not limited to regular IP over DOCSIS channel, preconfigured video channels in the form of LibraFlow generated messages, OOB channels, or any other channel.

The LibraFlow server might decide to send the same traffic to multiple LibraFlow tuner devices (including to clients who have not requested the traffic but are highly likely to do so in the future, i.e. pushing IP traffic as opposed to servicing IP requests) by using special "multicast" destination ID, and thus further enhancing the efficiency of the transmission especially of popular content. Pushing of content might further be performed according to a profile of the end user preferences, built on the server or on the client, with or without the client initiating the session and/or content request.

The LibraFlow server and client may implement TCP performance enhancing proxies (PEP) in order to overcome the longer latency typically existing in video QAMs. There are many methods for implementing PEP and any of them may be used without departing from the original intent of this invention.

A method and system is presented for the bidirectional transfer of data packets over a TCP communications system on long delay video edge QAM transparently to the end users, replacing the TCP over DOCSIS that accelerates the data delivery between end users, and improving reliability of the data packet transmission. The invention can eliminate the conventional TCP 3-way handshake and other associated time-delay procedures, and replaces them with an improved use of performance enhancing proxies at either end of the HFC plant (LibraFlow Client on CPE and LibraFlow Server), data buffer storage and packet header field arrangement among the design features of a protocol method and system that accelerates data packet transfer with more efficient link capacity use and greater data throughput.

In view of the above summary, it is clear that the LibraFlow System described herein provides a unique system and method for providing a transparent IP traffic offloading from DOCSIS channels into non DOCSIS channels and IP traffic acceleration by the use of IP traffic cache and multicast pushing. Moreover, the LibraFlow system overcomes challenges of transmitting data over video QAMs such as high latency and high BW sessions. In addition to the above-described benefits, other advantages of the LibraFlow system will become apparent from the detailed description which follows hereinafter when taken in conjunction with the accompanying drawing figures.

DESCRIPTION OF THE DRAWINGS

The specific features, aspects and advantages of the present invention will become better understood with regard to the following description and accompanying drawings where:

FIG. 7. illustrates few messages format used in the communication between the LibraFlow Server and Client.

DETAILED DESCRIPTION OF THE PREFERRED EMBODIMENT

In the following description of the preferred embodiment of the present invention, reference is made to the accompanying drawings, which form a part hereof, and in which is shown by way of illustration specific embodiments in which the invention is may be practiced. It is understood that other embodiments may be utilized and structural changes may be made without departing from the scope of the present invention.

1. Exemplary Operating Environment

Figure 1:
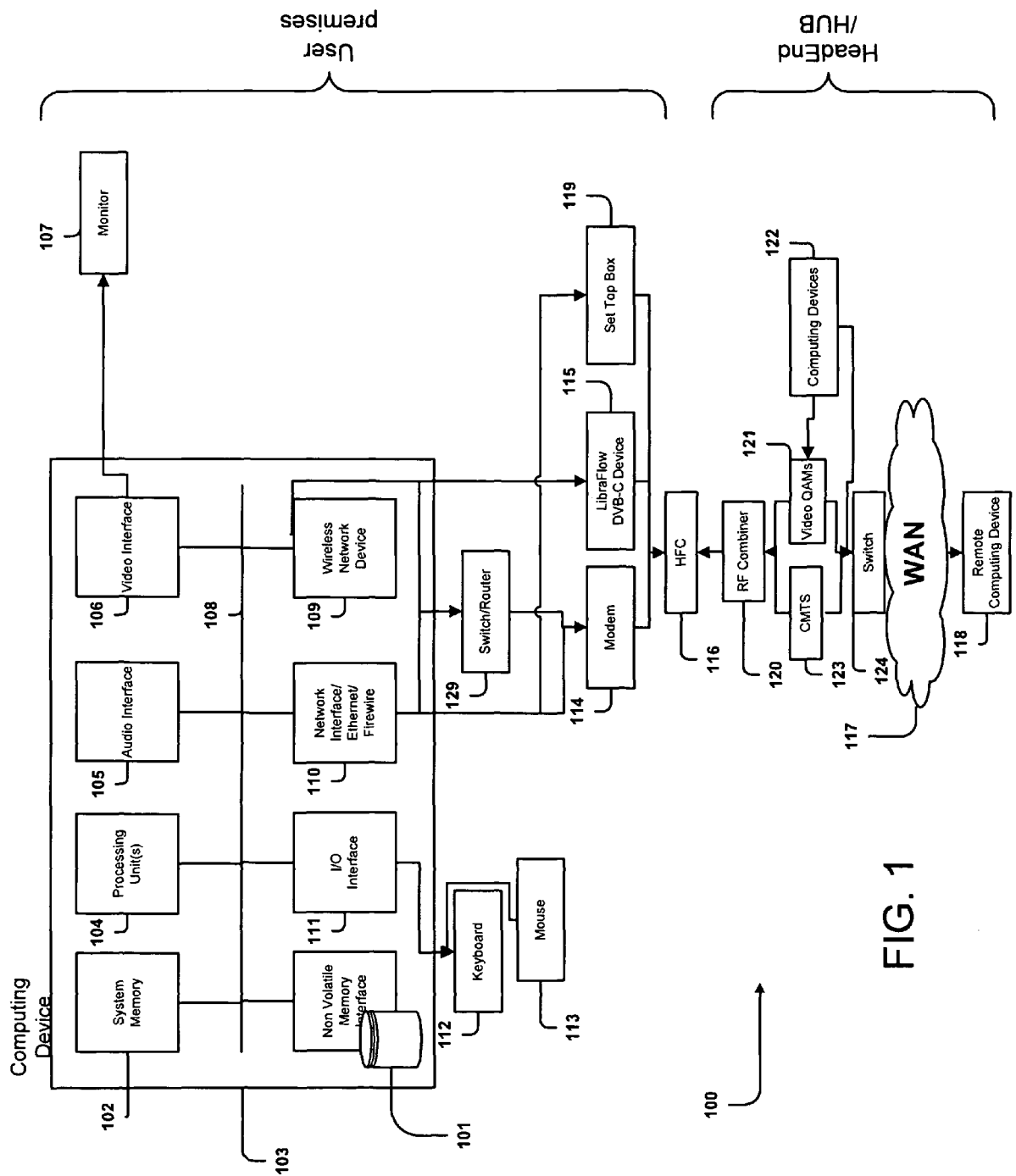
FIG. 1. is a general system diagram depicting a general purpose computing device constituting an exemplary system implementing a "LibraFlow" as described herein.

The invention consists of at least three parts: a LibraFlow (LF) server typically located in the Cable operator premises, a LibraFlow client/driver typically located in a CPE such as Cable Modem STB, OTT or a computing device at the end user premises and a tuning device typically located at the end user premises inside a CPE (such as but not limited to CM, STB, OTT) or a computing device (such as, but not limited to, a DVB-C tuner). FIG. 1 illustrates an example of a suitable computing system environment 100 on which part of the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, cable modem, server computers, handheld, laptop or mobile computer or communications devices such as cell phones and PDA's, multiprocessor systems, microprocessor-based systems, set top boxes (STB), over the top boxes (OTT), Residential Gateways, programmable consumer electronics, network PCs, minicomputers, mainframe computers, distributed computing environments that include any of the above systems or devices, and the like.

Part of the invention may be described in the general context of computer-executable instructions, such as program modules, being executed by a computer in combination with hardware modules, including components of a LibraFlow Tuner Device 115. Generally, program modules include routines, programs, objects, components, data structures, etc., that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices. With reference to FIG. 1, an exemplary system for implementing the invention includes a general-purpose computing device in the form of a computer 103.

Components of computer 103 may include, but are not limited to, a processing unit 104, a system memory 102, and a system bus 108 that couples various system components including the system memory to the processing unit 104, a non-volatile memory 101, audio interface 105, a keyboard 112, a mouse 113 or any other pointing device connected thru an input/output interface 111, a monitor 107 or any other viewing device such as, but not limited to, television, projector and the like connected thru a video interface 106.

The computer 110 may operate in a networked environment using logical connections to one or more remote computers, such as a remote computer 118. The remote computer 118 may be a personal computer, a STB, a wireless Router, a CM, a server, a router, a network PC, a peer device, or other common network node, and typically includes many or all of the elements described above relative to the computer 103. The logical connections depicted in FIG. 1 include a wide area network (WAN) 117, but may also include other networks such as local area network (LAN). Such networking environments are commonplace in homes, offices, enterprise-wide computer networks, intranets, and the Internet.

When used in a WAN networking environment, the computer 103 typically includes a modem 114. The modem 114, which may be internal or external, may be connected to the system bus 108 via the network interface 110, or other appropriate mechanism (such as but not limited to a router, a switch, a hub, a gateway, a wireless gateway etc . . . ).

It will be appreciated that the network connections shown are exemplary and other means of establishing a communications link between the computers may be used.

The LibraFlow server generally consists of computer executable instruction running on a computer similar to what's been described above 122 but any other implementation might be done without departing from the general scope of the server activities.

The exemplary operating environment having now been discussed, the remaining part of this description will be devoted to a discussion of the program modules and processes embodying a LibraFlow system which provides a transparent IP traffic offloading from DOCSIS channels into video channels and IP traffic acceleration, in part by the efficient (TCP protocol wise) performance enhancement proxies usage, and the usage of free BW in these video channels.

2. Introduction

A "LibraFlow" system and methods as described herein provides a IP traffic processing below the application level (and might therefore be transparent to the user and IP application level) and IP traffic offloading from DOCSIS networks into MPEG2 TS network and IP traffic acceleration by using available free BW in video channels in order to potentially multicast and push content into local cache existing in the end user computing device or to be used directly with any IP connected application (such as but not limited to web explorer, media players, file downloader and the like).

Figure 2:
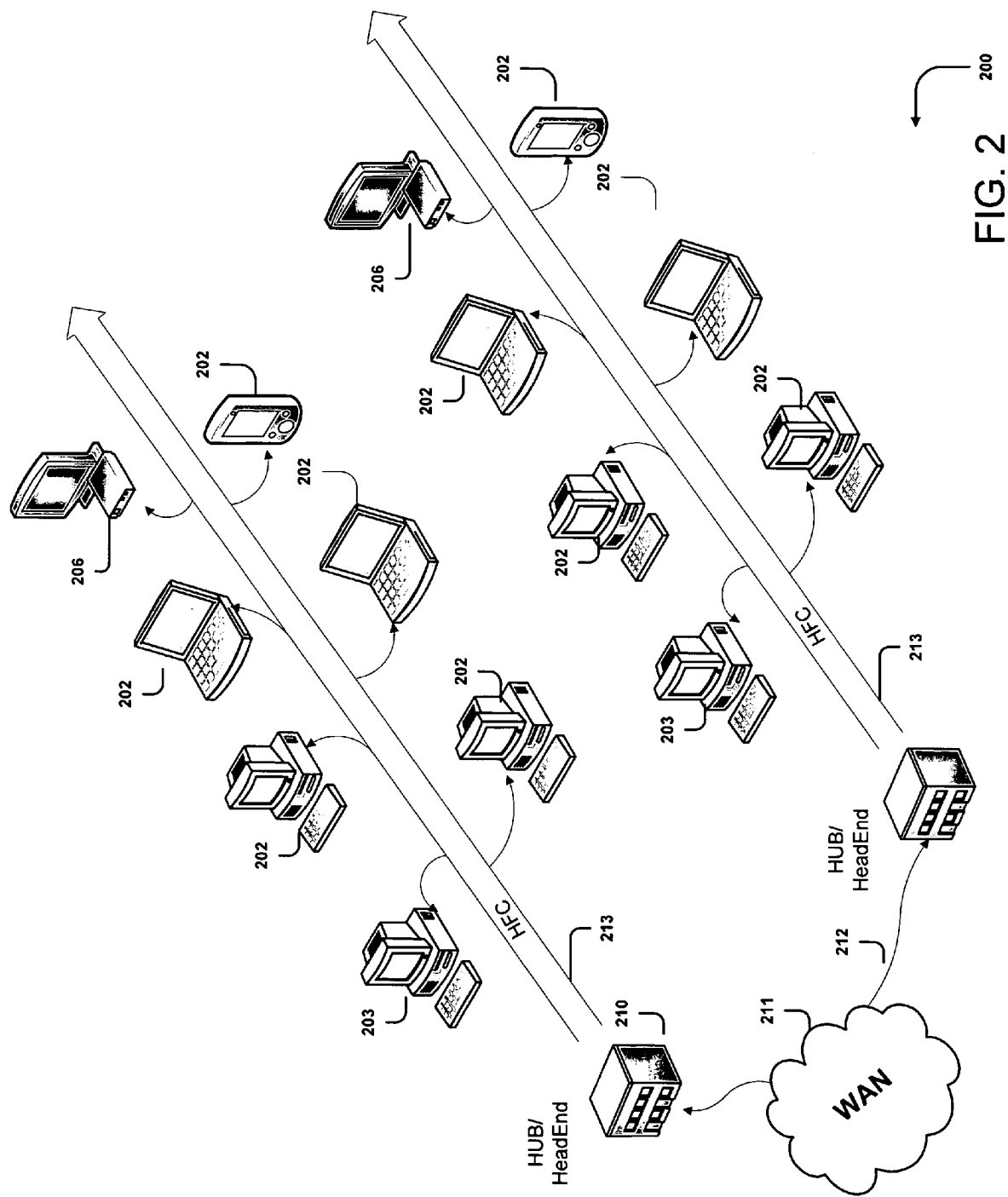
FIG. 2. illustrates an exemplary peer-to-peer (P2P) network for content downloading, as described herein.

In one embodiment of the current invention, the LibraFlow operates in P2P networks such as the network illustrated by FIG. 2. Peers 202 are trading pieces of files according to prior knowledge about the pieces locations. In one P2P networks example (BitTorrent network), such knowledge might be available by a central computing (tracker) device 203 and distributed/pulled/updated by any other peer 202. Peers 202 requesting a certain piece of a file do so directly from other peers. It should be noted that the peep to peer communication is optional and in other P2P protocols peers might download pieces of the content from central servers. All this P2P communication is done over DOCSIS data protocol which is run over dedicated DOCSIS channels shared by all peers on the HFC segment 213 that originates from the HUB/Head-End 210. There is currently no way to use the fact that most of the content flow is repetitive and the same content is sent separately to all requesting peers. In addition, the high BW P2P content fills up the DOCSIS channel and reduces customer's satisfaction as the available BW for interactive activities such as web browsing.

At the same time, most of the switched channels (such as, but not limited to, VOD, Switched Digital Video (SDV) Services, etc . . . ) are partially unused but, as they are not part of the DOCSIS channel, they cannot be used for relieving the BW load caused by P2P applications on DOCSIS channels.

LibraFlow solves all these issues. LibraFlow server transparently monitors and intercepts the P2P messages (either itself or with the help of the end-user device such as the CM, software driver at the end-user computing device etc . . . ) and decides to forward them to other Peers or serve them out of its local cache 510 in case the content has been pushed there earlier or forward them from the WAN or the local network thru the video channels by configuring the flow routing at the HE/HUB 210 switch or router. In addition, the LibraFlow server might prepare for future requests by pre-fetching and pushing the relevant content. The local cache is being updated 516 by the LibraFlow server according to certain priorities 519 statuses sent by the LibraFlow (LF) driver 518.

In another embodiment, the application at the end-user computing device 202 is requesting a file (such as but not limited to, an *.avi, *.flv, *.sdp, *.mpg, *mp4, *.zip, *.img, *.rar etc . . . ) the CM thru which the request is made may decide (based on any cretia such as but not limited to, size, type, interactivity, http context, etc . . . ) that this request should be serviced (if possible) thru the LibraFlow channels and tag this choice in the IP headers or by communicating with the LibraFlow server the requests details in the upstream DOCSIS channel inb a separate request before the application request is sent. This decision may also be taken in the LibraFlow server (thru which all communication may be passed for, among other tasks, monitoring) itself.

The LibraFlow server detects this flow characteristic and configures the DOCSIS router or switch to route this flow thru the LibraFlow server instead of the DOCSIS CMTS. The LibraFlow server then transmits the data back to the end-user application thru the LibraFlow channels via different manners described further below (such as session init, NULL replacements and the like . . . .)

Since the WAN servers that transmit these files typically implement a TCP protocol (in cases the transfer is done over TCP) the networking stack at the server expects an ACK before transmitting more than a TCP window (which size is changing and has a certain maximum—typically 64 KB). Since the video channels over which LibraFlow operates have a relatively large delay, the effective BW that can be passed using TCP is relatively low and does no make full usage of the possible free BW. In order to solve that limitation, one implementation example may consists of the LibraFlow server generates ACK to the WAN server and sends the data to the end-user CPE without expecting any ACK. Since the last mile i.e. the LibraFlow channel is very reliable (this is, in part, the reason for the large delay) ACK-ing at the LibraFlow server is not reducing the reliability of the transfer as a whole. The CPE at the user premises is typically instructed to ignore the relevant flow ACK originating form the user—user computing device networking TCP stack. Another solution might be to implement a buffering at the LibraFlow server (with buffer size equal to the amount of data sent over the LibraFlow channel that still have not been acknowledged (i.e. BW×Delay) and implement a TCP protocol between the LibraFlow server and Client but with much larger TCP windows). It should be noted that other implementations of performance enhancement proxies (PEP) can be implemented without departing from the general idea of the invention.

3. System Architecture

Figure 4:
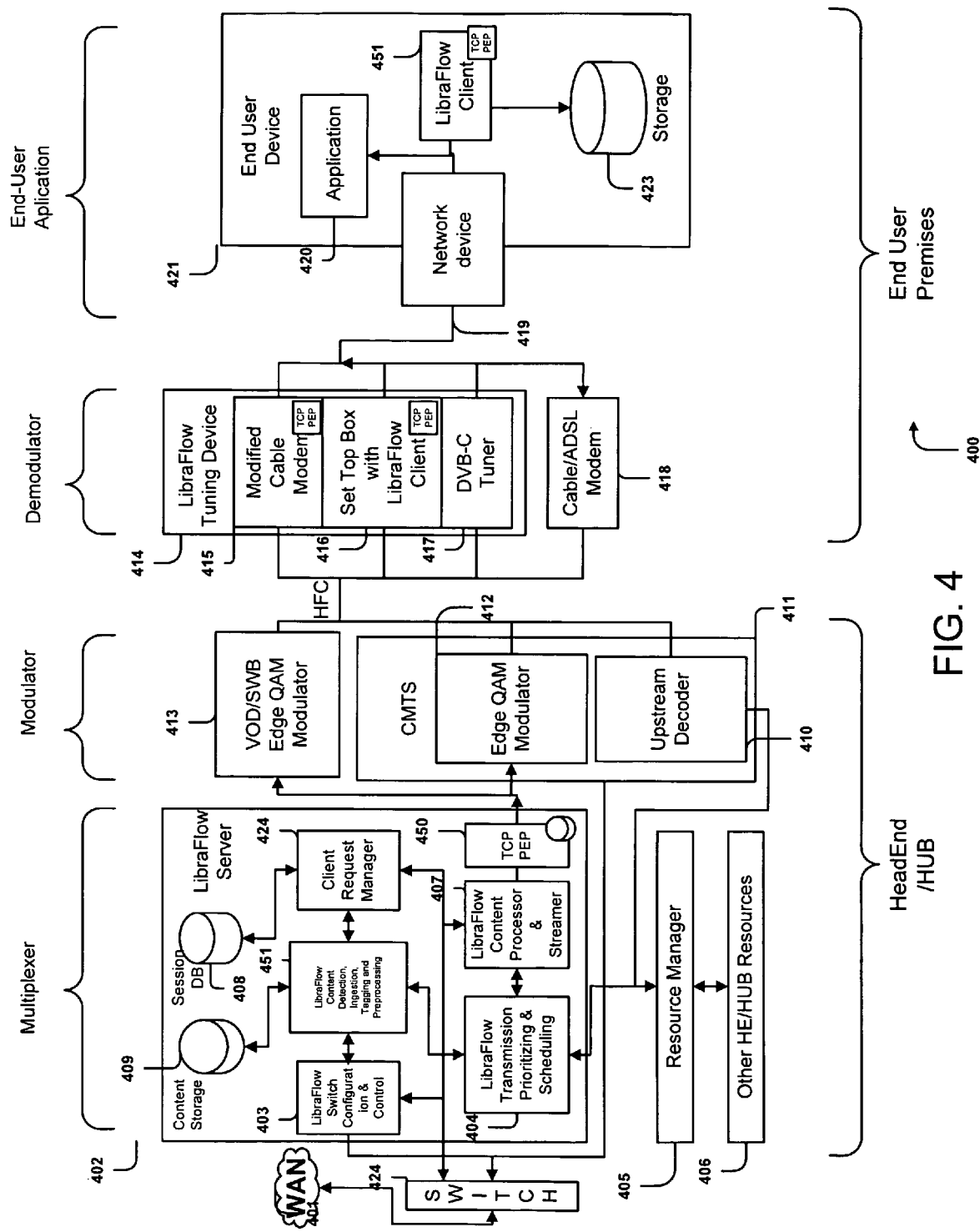
FIG. 4. provides an architectural system diagram representing the LibraFlow client server environment.
Figure 5:
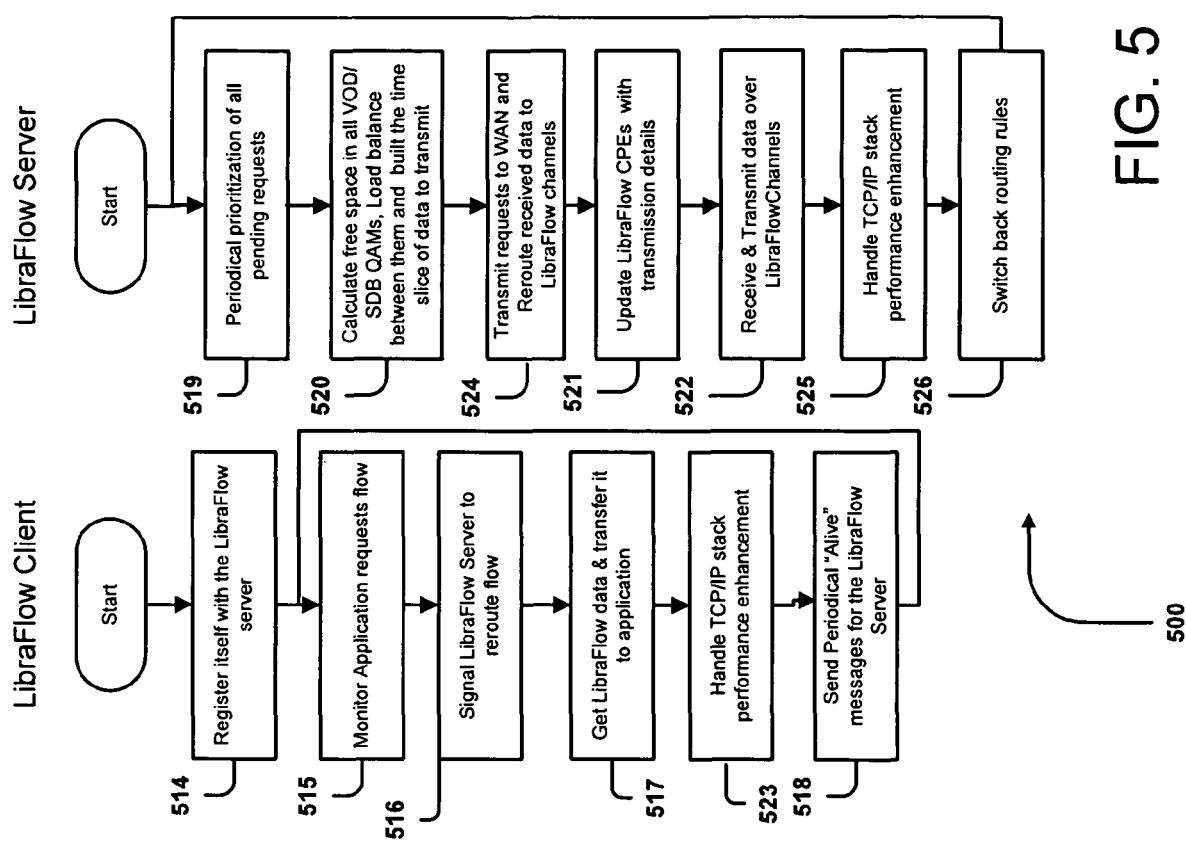
FIG. 5. Provides an operation flow diagram which illustrates the general operation of one embodiment of the LibraFlow as described herein.

The processes summarized above are illustrated by the general system diagram of FIG. 4. In particular, the system diagram of FIG. 4. illustrates the interrelationship between program (and possible hardware) modules for implementing a LibraFlow, as described herein.

3.1. LibraFlow Client

In general, the LibraFlow Client driver are loaded by default as part of the tuning device device 414 initialization or the end-user computing device 421 operating system loading or by request of the user. Upon loading, The LibraFlow client registers itself with the LibraFlow server and receive at least a client ID and at least one destination IDs and potentially other parameters (including, but not limited to DOCSIS MAC, encryption/decryption keys, watermarks etc . . . ). The client ID or DOCSIS MAC will serve as identification as the source of the messages and destination ID will serve to determine the destination of content flowing from the server to the clients.

It should be noted that in some embodiments of the present invention, the data is locally processed before being returned to the application level. One such processing is, for example, potentially personalized, advert insertion or replacing in content type including, but not limited to, video, games etc . . . , others include but are not limited to decryption and encryption of the content according to a key received at some previous stage, watermarking etc. . . .

Note that while the LibraFlow as described herein is applicable for use in HFC networks, those skilled in the art will understand that the above content processing embodiment offered by LibraFlow driver is applicable to other network including but not limited to wireless, ADSL, Satellite and the like or any other environment with a combination of a fast link and a much broader link with unused opportunities and a relatively high delay which limits its use.

Figure 3:
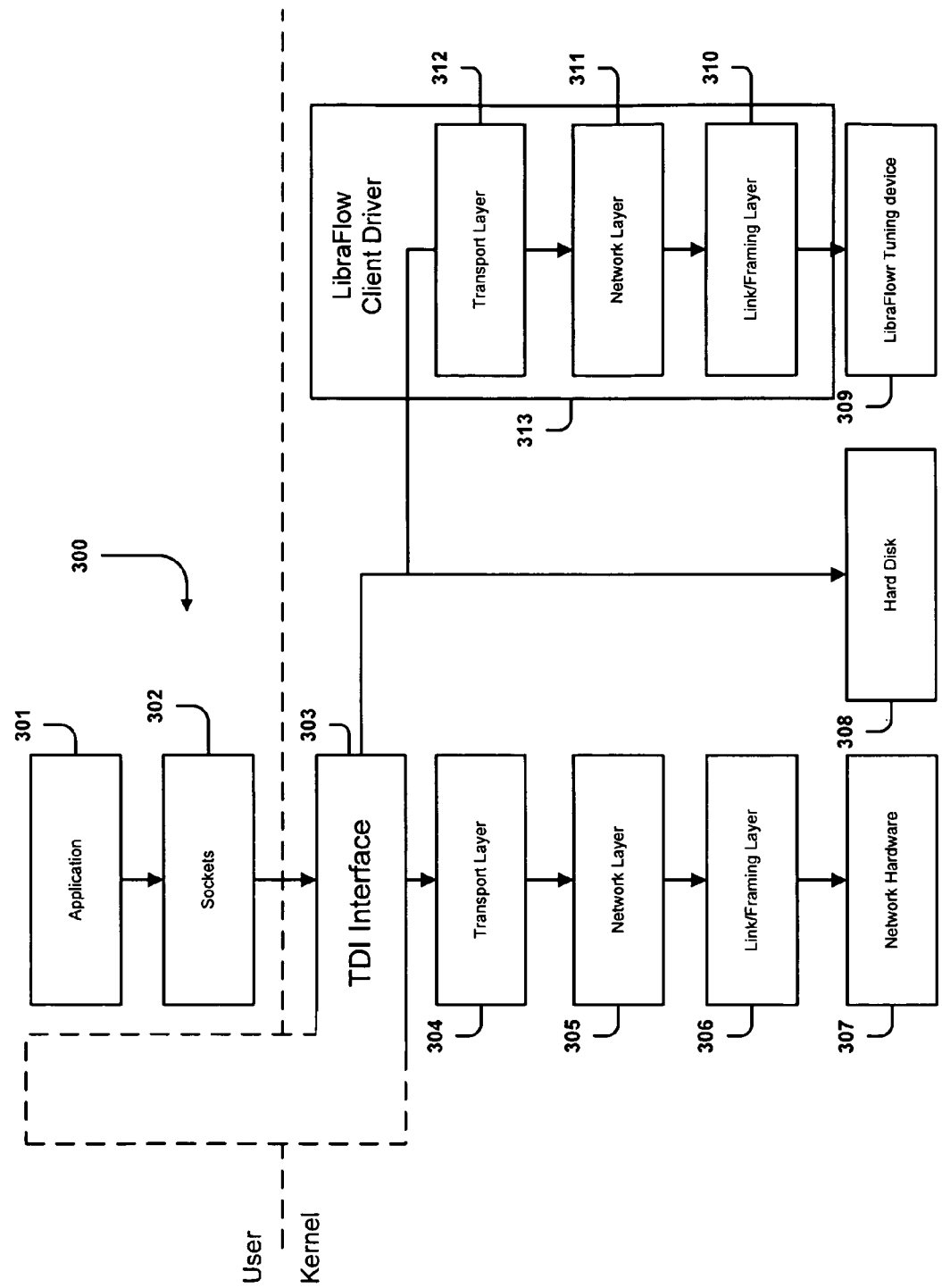
FIG. 3. provides an exemplary architectural diagram which illustrates program modules for implementing the "LibraFlow" with a DVB-C tuning device, for example.

The LibraFlow Client driver (operating inside the CM in case of a modified CM 415 or on a end-user computing device 421 in case of STB 416 or DVB-C tuner 417) is interrupted by the LibraFlow Tuner device Hardware (either internally in a CM 415 or externally in case of a STB 416 or DVB-C Tuner 417 414) whenever there is LibraFlow generated traffic to be inspected and processed. The exact behavior is determined by the LibraFlow Hardware device. In modified Cables Modems 415, the interface to the end-user computing device is a regular Ethernet network interface 110 since the CM modification is only at the DOCSIS level. The LibraFlow generated traffic is sent to the LibraFlow client as regular DOCSIS MAC frames or any other format (after being TS layer decapsulated by the MAC Hardware usually existing in such CM 415). The DOCSIS MAC is being decapsulated by the LibraFlow Client and sent via the Ethernet interface to the end-user computing device, potentially thru a router/switch/gateway where it is merged with traffic from DOCSIS channels, as if it came from the regular DOCSIS channel. Practically the same interface is used with STB 119, 416 running a LibraFlow client that extract the LibraFlow generated traffic out of a video channel and send it over UDP/TCP/Raw to the end user computing device via a network interface 110. A DVB-C tuner 417 generally directly extracts the channel TS traffic directly to the computing device memory 102. The LibraFlow Client, in this case, decapsulate the TS and DOCSIS framing and insert the IP directly in the Networking stack of the end-user computing device as is depicted in FIG. 3 as if it came directly from the DOCSIS channels.

In order to overcome the inefficiency of protocols such as TCP over relatively high delay of the video channel (which is due to dejittering buffer, dedrifting buffers, long interleaver etc . . . ) a Performance Enhancing Proxy (PEP) 450 or other similar functionality is included at both sides of the video channels. 416, 451

The LibraFlow server determines which flow or session should be delivered through the LibraFlow channels and whether it should bypass the PEP mechanism or not. The LibraFlow server determines on the nature of each flow by either deep packet inspection functionality or by getting information from the Libra client.

3.1.1. LibraFlow Tuning Device Hardware

Generally, the LibraFlow client listens for LibraFlow traffic on preconfigured or dynamically chosen LibraFlow channels and tunes the LibraFlow tuning device hardware 414 to that specific frequency. The LibraFlow tuning device hardware might consist of a DVB-C tuner 417 that captures and reads all data in a specific frequency channel, a software modified Cable Modem 415 (software modification is needed since the LibraFlow generated traffic is sent over non DOCSIS channels and regular CM need to perform various DOCSIS related operations before they can tune to a channel as well as expects certain DOCSIS MAC framing or any other MAC framing. In order for the CM to tune to a non DOCSIS channel and extract all information from the channel, a special software that skips the DOCSIS related steps (such as ranging, registration with the CMTS etc . . . ) or performs theme and then tune to the LibraFlow frequency or perform them in one channel and let the others tune for the LibraFlow traffic (e.g. in multi-tuners CPE such as in DOCSIS-3 CM where a primary channel will be used for registration and all DOCSIS control steps whereas all other channels are free for LibraFlow activities), and is able to tune to a certain frequency and decapsulate (from DOCSIS MAC or any other encapsulation) and restructure (into IP) the received traffic and send it to the computing device is needed. Typically, at least one of the tuners in a DOCSIS 3 (or any backward compatibility) cable modem for example, or a Set Top Box with a software that accept commands from the LibraFlow client to tune to a certain channel frequency, extract the transport packets, potentially encapsulate then in some Ethernet framing (such as but not limited to UDP/TCP and raw) and send them to the end user computing device to be processed via various networking layers 312, 311 and 310. It is understood that other embodiments that extract data from the video channels may be utilized and structural changes may be made without departing from the general idea just described. The data the LibraFlow hardware reads from the frequency it is tuned to is usually a Transport stream in the form of 701, The LibraFlow hardware, in case of a DVB-C tuner, will then listen for LibraFlow generated traffic 515 and extract the LibraFlow generated traffic (TS packets encapsulating a DOCSIS MAC layer) which might either be unicast (sent to a specific client) or multicast (in case the content is sent to multiple clients). It should be noted that various additional fields might have to be processed or discarded such as, but not limited to, the PCR field in 705 which is needed in order to send the LibraFlow generated traffic thru conventional QAM device 413.

In some embodiment, the LibraFlow data 709 is extracted 713 and inserted in the local storage 516 cache 423 according to preconfigured conditions (typically negotiated with the LibraFlow server in order to provide a push to storage functionality, for example.)

Regular keep-alive 517 notifications are potentially sent to the LibraFlow server.

3.2. LibraFlow Server

The LibraFlow content storage 409 is constantly updated by the content ingesting, tagging and preprocessing module

403. This module pre-fetches and caches the requested content from the WAN 401 (to which it is connected via typically a very broad connection) and enables local injection of content (possibly preprocessed for later adverts insertion at the client driver, for example) for pushing into the LibraFlow client. In addition, this module will be able to interface any external entity that will assist it with any of its tasks. This module also enables placement of content typically ahead of the content distribution in order to ease the content distribution.

In one embodiment, the content ingesting, tagging and preprocessing module 403, whenever it detects that the content requested consists of a video content, preprocess the content in a series of steps that include, but is not limited to, transcoding, resolution change, frame rate change, and any other preprocessing that will assist the content streaming to LibraFlow client over BW restricted channel by adjusting the sent content to one or many of the channel instantaneous properties (for example, available BW).

The LibraFlow server 424 is listening for client request messages either in form 702 or regular IP requests for data. Every client request is potentially logged in the Session DB 408.

At periodical intervals 519, the prioritizing module 409 goes over all clients request and sort them according to specific parameters that include, but is not limited to, request characteristics such as popularity, urgency (real time streaming or non-interactive download), size, requesting client service grade (premium, regular etc . . . ), various business related agreements (such as files that are paid to be distributed to users via high bandwidth channels), etc. . . . The LibraFlow transmission, prioritizing and scheduling module 404 will then take the most urgent requests, in one embodiment, interface the resource manager 405, in another embodiment interface the streamer 407 and calculated the amount of free BW that is available for the next transmission time slice (which can be of any duration). The LibraFlow transmission, prioritizing and scheduling module 404 might decide, based on the available BW, for example, to send the client a preprocessed version of its request (one such preprocessing, for example, is encapsulation in DOCSIS MAC in order for the traffic to pass the DOCSIS MAC layer of the target CM). It will then schedule 520 the transmission of each of the LibraFlow Transport packet traffic 701 and its relevant content 709 taken from the LibraFlow storage 409 or rerouted into the streamer 407 by controlling the switch 424 and configuring the output "leg" of specific flows (that are received as a result of end-users IP requests).

In one embodiment, the transmission details will be sent to relevant LibraFlow clients in a LibraFlow message 714 over the regular DOCSIS channel thru a typically TCP (or any other protocol, such as but not limited to, UDP, raw Ethernet IP messages etc . . . ) connection with the LibraFlow client. The LibraFlow server will then stream 407 the LibraFlow generated traffic into the appropriate free BW channel 413. In other embodiment, the transmission and frequency control will be sent along the video channel along with other LibraFlow traffic.

In order to overcome the inefficiency of protocols such as TCP over relatively high delay of the video channel (which is due to dejittering buffer, dedrifting buffers, long interleaver etc . . . ) a Performance Enhancing Proxy (PEP) 450 or other similar functionality is included at both sides of the video channels, 416, 451

4. Operational Details of the LibraFlow System

4.1. Topology Discovery

On each QAM channel that the LibraFlow server transmits its data, it also transmits a dedicated message. The message that is transmitted using a pre-defined multicast address is received by each client that is tuned to a LibraFlow QAM channel. The message contains two attributes:
1. QAM channel Id: uniquely identifies the QAM channel among all QAM channels in the system;
2. IP address of the LibraFlow server.

The client sends messages to the server (for example, to request specific content) using the IP address that it obtained from the above message. The message sent by the client to the server contains all the information needed by the server in order to reach the client. This includes the IP and MAC addresses of the user that requested content and the unique QAM channel id. The server then uses the above information by using the IP and MAC addresses when encapsulating the content as DOCSIS frames and by delivering the DOCSIS frames on the appropriate QAM channel to which the client is tuned. The server may alternatively discover the serving area from the QAM channel ID and possibly tune the client to another QAM channel.

4.2. Client Capabilities Discovery

The client optionally transmits to the server, information regarding its capabilities, such as but not limited to number of tuners, number of QAMs channels per tuners, QAM channel bandwidth (ITU-A, ITU-B), number of users (CPE) supported, and/or maximum bitrate per CPE.

4.3. Client Identification

The client optionally transmits to the server, identification information such as but not limited to vendor ID, model number, and/or serial number.

4.4. Client Statistics

The server may aggregate one or more client events for statistic analysis and illustration.

4.5. Registration of Data Requests and Replies

All interactive LibraFlow Registration and message passing from server to client and vice versa is done either over regular DOCSIS channel or OOB since it requires a two way channel (upload and download) but generally does not consume a lot of BW or via the LibraFlow channel itself in case it is download only.

Data transfer replies and frequency change requests from the LibraFlow server are done over video channels (when available BW exists), potentially with the addressing tag (multicast/unicast) used to target the destination tuners or with the regular DOCSIS MAC and regular Ethernet headers. This traffic is generally of high BW and of download direction only.

The messages flowing from the server into clients can be changed in order to allow additional benefits including, but not limited to, content encryption or DRM.

In one embodiment, the content is kept encrypted at the LibraFlow server and the decryption is done at the LibraFlow client using keys transmitted at earlier stage. In such embodiment, the content provider has more control on users that are able to access a clear version of their content. One such control would be to decrypt the content at the LibraFlow Client and potentially insert a watermark.

4.6. LibraFlow Transmission

The available BW in the video channels can be allocated from several sources: one such source is a Resource Manager 405 typically existing in switched digital video installations that provisions all QAMs BW allocated for switched services and can grant available BW upon request. Another method is by buffering the video traffic (including VOD, and even broadcast video channels) and replacing NULLs or other TS packets. Another way is to imitate the Edge device and create from several Single Program Transport Stream (SPTS) (including the LibraFlow generated traffic as one or more SPTS services) a Multiple Program Transport Stream (MPTS) that can be delivered to the Edge device.

In order to take advantage of video transport channels existing modulators (i.e. not only DOCSIS modulator with all their derived complexity), the LibraFlow generated traffic is "encapsulated" as video transport traffic and sent on a DOCSIS pid (typically 0x1ffe) so as to come thru DOCSIS MAC hardware in end-user CPE or can be sent in any other MPEG TS level mechanism. Generally, edge QAMs 413 uses the Program Clock Reference (PCR) in order to calculate the Bit Rate (BR) with which to stream the traffic to the physical HFC lines. In order to emulate video TS traffic, PCR are inserted in the LibraFlow Transport packets at regular interval (typically every tenth of milliseconds) and are restamped according to the BR the LibraFlow generated traffic is sent at. Typically, the PCR pid is on another PID than the DOCSIS pid, in some cases PCR insertion may not be needed.

In cases there is no possibility to send a LibraFlow stream to an edge QAM (including, but not limited to, cases where a VOD server provides an already built video channel mux to be directly modulated and transmitted by the edge QAM or broadcast channels that are flowing out of muxing devices and contain available BW), the LibraFlow generated traffic can be inserted by packet replacement technique. In this method, all traffic originating from the video source 406 is fed into LibraFlow content streamer 407 where it is subjected to a small fix time delay. While in this time delay, LibraFlow generated traffic originating from 404 can be inserted instead or in addition to the original video streams. It should be noted that additional stream characteristic such as but not limited to Program Specific Information (PSI) packets should be updated to reflect the addition of the new service (including, but not limited to, setting the LibraFlow generated traffic as a private data in a new service so that no interference might occur with the video services).

The LibraFlow server monitors, load balances and negotiates available BW with the Resource Manager 405 for the LibraFlow generated traffic between all video channels having available BW in order to fully utilize the free BW in all video channels.

Figure 6:
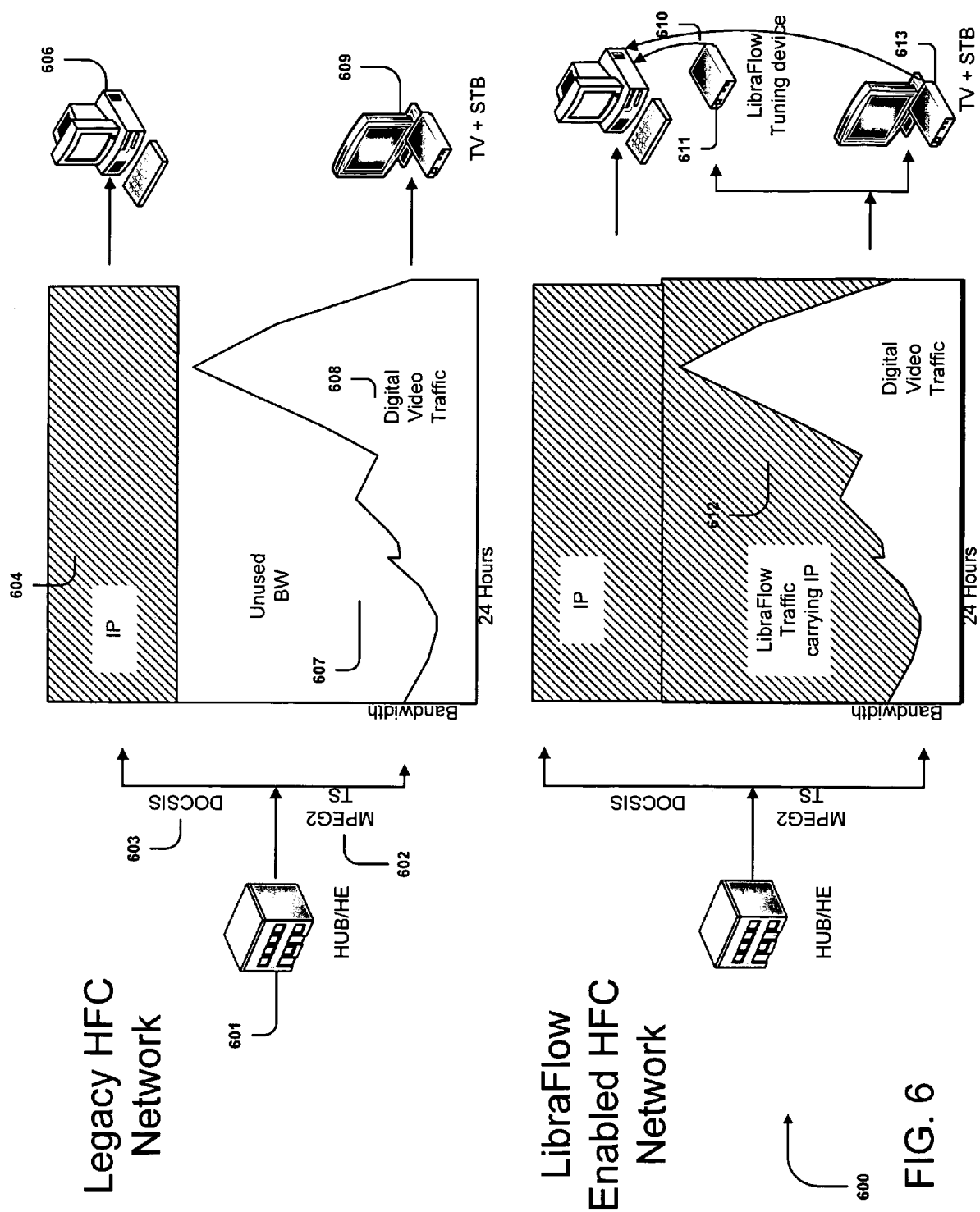
FIG. 6. illustrates the benefits in a specific embodiment in which the invention is may be practiced.

FIG. 6. provides the benefits in a preferred embodiment in which the application may be used. It can be seen how in legacy HFC network, the IP fills up the DOCSIS channel 604 while the video channels 607 are mostly unused. Using LibraFlow, the IP requests messages are transparently caught up in the CM 606 preprocessed and sent to the LibraFlow server located at the cable operator premises 601 or directly caught up at the HE/HUB 601 in the LibraFlow server. The IP traffic, whether brought in immediately from the WAN or already existing at the server storage (since it was cached in some earlier stage or pushed by a content provider or even requested from another entity having the content in available form, for example) at the Cable operator premises is either encapsulated in LibraFlow generated traffic and is sent via the video channels 612 while they are unused (and thus enable much more BW available to the end user while freeing DOCSIS channels for other more interactive applications with less download characteristics) or rerouted using a switch from the WAN into the Video channels thru the LibraFlow streamer to be encapsulated in DOCSIS MAC and added PCR pid. A LibraFlow tuning device 611 (software modified CM, DVB-C tuner with special LibraFlow driver implementing the LibraFlow Client), or a STB with a LibraFlow client 613 picks up the LibraFlow generated traffic, process it (potentially adapting it to the end user including, but not limited to content personalization and targeted advertising) and transparently transfer it to the end user computing device 606 to be placed in a local cache or used immediately as part of the regular networking stack.

The foregoing description of the LibraFlow has been presented for the purposes of illustration and description. It is not intended to be exhaustive or to limit the invention to the precise form disclosed. Many modifications and variations are possible in light of the above teaching. Further, it should be noted that any or all of the aforementioned alternate embodiments may be used in any combination desired to form additional hybrid embodiments of the LibraFlow.

What is claimed is:

1. A method for providing client-server data transfer over a Hybrid Fiber Coax network, comprising:
   interfacing, at a client, a channel, wherein the channel is one of a video channel and a DOCSIS channel;
   intercepting a content request made from an end-user computing device;
   notifying a server of a relevant intercepted message via one of using an interactive channel and tagging the request;
   selecting content sent by the server over the channel, the content being sent in a plurality of windows;
   processing the content selected so as to return it to its IP traffic format; and
   forwarding the content in its IP traffic format to the end-user computing device;
   wherein the client and the server are proxies in a performance enhancing proxy (PEP) setup and are configured to transform a windows ACK dependent protocol into a windows ACK independent protocol connection over a last-mile link.

2. The method of claim 1, further comprising:
   decapsulating a DOCSIS MAC frame;
   rebuilding an IP frame; and
   forwarding the IP frame to the end-user computing device.

3. The method of claim 1, wherein the interactive channel is a DOCSIS channel.

4. The method of claim 1, wherein the windows ACK dependent protocol is TCP and windows ACK independent protocol is UDP.

5. The method of claim 1, further comprising blocking at the client an ACK originating from content reception at the end-user computing device.

6. The method of claim 1, further comprising sending ACK to the server from the end-user computing device upon successful reception of a window of content.

7. The method of claim 1, wherein the client operates in a DOCSIS 3 CM.

8. The method of claim 7, wherein at least one of a plurality of tuners is controlled by regular DOCSIS control and at least one of the plurality of tuners is available for client control; and
   wherein interfacing, at the client, the channel comprises operating by the client the at least one of the plurality of tuners available for client control.

9. The method of claim 1, wherein the client operates in one of a DOCSIS 2 CM and another compatible tuner; and wherein the method further comprises performing CMTS registration of the client and server prior to interfacing the channel.

10. The method of claim 1, wherein the client operates in a pre-DOCSIS 3 CM, and wherein at least one of multiple DOCSIS 2 and backward-compatible tuners are bonded together to effectively provide DOCSIS 3 functionality; and wherein interfacing, at the client, the channel comprises operating the tuners by the client.

11. The method of claim 1, further comprising tagging the content request to indicate to the server where to send the request response.

12. The method of claim 1, wherein the content and the relevant intercepted message is of a type chosen from the group consisting of P2P application type, Video application type, file transfer application type, content over TCP protocol, and content over UDP protocol.

13. The method of claim 1, further comprising preprocessing one of the content and the relevant intercepted message.

14. The method of claim 1, further comprising altering one of the content and the relevant intercepted message according to one of the content destination, a key, and other end-user related information.

15. The method of claim 1, wherein the processing includes replacing a video frame and inserting an advert.

16. The method of claim 1, wherein the processing includes one of encryption and decryption of the content.

17. The method of claim 1, wherein the network is of a type chosen from the group consisting of cable, xDSL, and Satellite.

18. The method of claim 1, wherein the client-server data transfer occurs over a high bandwidth, high latency channel.

19. A method for providing client-server data transfer over a Hybrid Fiber Coax network, comprising:
   interfacing, at a client, a channel, wherein the channel is one of a video channel and a DOCSIS channel;
   intercepting a content request made from an end-user computing device;
   notifying a server of a relevant intercepted message via one of using an interactive channel and tagging the request;
   selecting content sent by the server over the channel;
   processing the content selected so as to return it to its IP traffic format; and
   forwarding the content in its IP traffic format to the end-user computing device;
   wherein selecting content sent by the server over the channel further comprises intercepting at the client a server message sent by the server.

20. The method of claim 19, wherein the server message is one of a DOCSIS message and a proprietary message.

21. The method of claim 19, further comprising providing information to the server to allow the server to reach the client, using the server message.

22. A method for providing client-server data transfer over a Hybrid Fiber Coax network, comprising:
   listening, at a server, for a request for content from a client, wherein the request is made from an end-user computing device, via one of using a communication channel and detecting a tag on upstream IP traffic;
   managing an amount of available bandwidth in a plurality of channels, wherein each of the plurality of channels is one of a video channel and a DOCSIS channel; encapsulating the content in a format suitable for at least one of the plurality of channels with available bandwidth; and
   sending the content to a client over the at least one of the plurality of channels;
   wherein, if the at least one of the plurality of channels with available bandwidth is a video channel, sending the content to the client over the at least one of the plurality of channels includes preprocessing the content to allow acceptance by a DOCSIS MAC filter at a cable modem by at least encapsulating the content in DOCSIS MAC frames, and encapsulating the content to simulate video traffic, and sending the content over a regular video edge QAM.

23. The method of claim 22, wherein the content is preprocessed and adapted to the bandwidth of the at least one of the plurality of channels.

24. The method of claim 22, wherein the format is suitable for a target cable modem.

25. The method of claim 22, wherein the intercepting occurs at a client, and wherein the client and the server are proxies in a performance enhancing proxy (PEP) setup and are configured to transform a windows ACK dependent protocol into a windows ACK independent protocol connection over a last-mile link.

26. The method of claim 25, wherein the windows ACK dependent protocol is TCP and windows ACK independent protocol is UDP.

27. The method of claim 22, further comprising:
   transmitting the request for content from the server to a WAN server;
   receiving the requested content at the server from the WAN server;
   forwarding the requested content to the client;
   returning an ACK corresponding to the requested content to a WAN server from the server instead of from the end-user computing device.

28. The method of claim 22, wherein managing an amount of available bandwidth in a plurality of channels further comprises performing, at the server,
   buffering an amount of data equivalent to the multiplication of bandwidth and delay of the at least one of the plurality of channels; and
   implementing a TCP connection with a window having a size of at least the multiplication of the maximal bandwidth and delay of the at least one of the plurality of channels.

29. The method of claim 22, further comprising;
   transmitting the request for content from the server to a WAN server;
   receiving the requested content at the server from the WAN server;
   forwarding the requested content to the client;
   wherein receiving the requested content includes monitoring and detecting traffic intended for the at least one of the plurality of channels.

30. The method of claim 22, wherein the content is of a type chosen from the group consisting of P2P application type, Video application type, file transfer application type, content over TCP protocol, and content over UDP protocol.

31. The method of claim 22, further comprising initializing the at least one of the plurality channels prior to sending the content to the client over the at least one of the plurality of channels by informing the client of transmission details over one of a DOCSIS channel, another OOB channel, and a video channel.

32. The method of claim 22, further comprising preprocessing the content to enable later expedited processing at the client.

33. The method of claim 32, wherein the preprocessing includes one of adapting the content to enable quick insertion of adverts, and replacing existing adverts with other adverts.

34. The method of claim 32, wherein the preprocessing includes one of encryption and decryption of the content.

35. The method of claim 22, further comprising:
preprocessing the content if it is of video format; and
generating multiple versions of the content having at least one of different resolutions, frame rates, bit rate and other video encoding parameters.

36. The method of claim 22, further comprising maintaining a plurality of client requests.

37. The method of claim 22, further comprising prioritizing the request for servicing and choosing a version of the content according to at least one of content type, urgency, user account level, and available bandwidth.

38. The method of claim 22, further comprising load balancing the transmission over the at least one of the plurality of channels.

39. The method of claim 22, further comprising preprocessing the content to simulate regular video content, by at least inserting PCR, updating the PSI, and transmitting it over regular video edge QAM.

40. The method of claim 22, further comprising preprocessing the content to allow acceptance by a DOCSIS MAC filter at the cable modem, by at least encapsulating the IP traffic in DOCSIS MAC frames and sending it over DOCSIS edge QAM.

41. The method of claim 22, further comprising sending the content to a plurality of clients, wherein the content is the same for each of the plurality of clients.

42. The method of claim 22, wherein the network is of a type chosen from the group consisting of cable, xDSL, and Satellite.

43. The method of claim 22 wherein the client-server data transfer occurs over a high bandwidth, high latency channel.

44. The method of claim 22, further comprising initializing the at least one of the plurality channels prior to sending the content to the client over the at least one of the plurality of channels by:
receiving a message from the client; and
using the message to determine how to reach the client.

45. The method of claim 22, further comprising initializing the at least one of the plurality channels prior to sending the content to the client over the at least one of the plurality of channels by:
receiving a message from the client; and
using the message to collect information.

46. The method of claim 45, further comprising producing statistics using one of the message and the information.

47. The method of claim 22, further comprising:
identifying that the same content is to be delivered simultaneously to a plurality of clients; and
changing the delivery method so that the content is sent only once and received by the plurality of clients.

48. The method of claim 22, further comprising storing the content so that it is available for one of the client and another future client.

49. The method of claim 22, further comprising distributing the content to other servers.

* * * * *